US011304412B2

(12) United States Patent
Anthony, Jr.

(10) Patent No.: US 11,304,412 B2
(45) Date of Patent: Apr. 19, 2022

(54) KNOTLESS LINE ATTACHMENT APPARATUS

(71) Applicant: Gerald Lee Anthony, Jr., Orlando, FL (US)

(72) Inventor: Gerald Lee Anthony, Jr., Orlando, FL (US)

(*) Notice: Subject to any disclaimer, the term of this patent is extended or adjusted under 35 U.S.C. 154(b) by 118 days.

(21) Appl. No.: 16/656,523

(22) Filed: Oct. 17, 2019

(65) Prior Publication Data

US 2020/0120912 A1    Apr. 23, 2020

Related U.S. Application Data

(60) Provisional application No. 62/747,111, filed on Oct. 17, 2018.

(51) Int. Cl.
*A01K 91/047*    (2006.01)

(52) U.S. Cl.
CPC .................. *A01K 91/047* (2013.01)

(58) Field of Classification Search
CPC ...... H01R 4/4845; H01R 4/4818; H01R 4/52; A01K 91/047; A01K 91/04; Y10T 403/7064; F16B 7/02; F16B 2/06
USPC ........ 439/788, 775, 786, 787; 279/9.1, 46.1, 279/46.2, 46.3, 46.5, 46.6, 50
See application file for complete search history.

(56) References Cited

U.S. PATENT DOCUMENTS

| | | | | |
|---|---|---|---|---|
| 633,852 A | * | 9/1899 | Kendrick | B23B 31/201 279/50 |
| 1,320,181 A | * | 10/1919 | Smith | B23B 31/202 279/43 |
| 1,368,446 A | * | 2/1921 | Madsen | B25B 27/24 29/249 |
| 1,558,225 A | * | 10/1925 | Boeker | A61C 17/00 15/210.1 |
| 1,854,782 A | * | 4/1932 | Cook | H01R 4/52 439/788 |
| 1,997,649 A | * | 4/1935 | Ohlund | H01R 4/52 439/788 |
| 2,138,913 A | * | 12/1938 | Fotsch | H01R 4/52 403/303 |
| 2,158,892 A | * | 5/1939 | Becker | F16G 11/08 439/863 |
| 2,161,694 A | * | 6/1939 | Becker | F16G 11/048 439/820 |

(Continued)

*Primary Examiner* — Darren W Ark
*Assistant Examiner* — Zoe Tam Tran
(74) *Attorney, Agent, or Firm* — Lowndes; Stephen C. Thomas

(57) ABSTRACT

A line attaching apparatus, system and method for attaching to a line end without the need for tying a knot. The invention further comprises a line attaching apparatus, system and method for attaching to a first line end portion to a second line end portion without the need for tying a knot. The line end portions may be captured in a collet having a line retention and a line insertion/removal state. The collet may be biased into a line retention state by a biasing force that causes the collet to close around a line, preventing the line from translating within the collet. The line insertion/removal state may be achieved by motivation of a plunger against the biasing force, allowing the collet to open so that a line moves freely within the collet opening. An exemplary, non-limiting use is the attachment of a lure or hook to a fishing line.

5 Claims, 17 Drawing Sheets

(56) References Cited

U.S. PATENT DOCUMENTS

| | | | | |
|---|---|---|---|---|
| 3,205,300 | A * | 9/1965 | Becker | H01R 4/52 174/84 S |
| 3,299,830 | A * | 1/1967 | Hora | E21B 17/06 403/24 |
| 4,525,111 | A * | 6/1985 | Gutsche | B25B 21/007 279/43 |
| 6,520,800 | B1 * | 2/2003 | Michelbach | H01R 4/4818 439/440 |
| 10,285,391 | B2 | 5/2019 | Ohashi et al. | |
| 2002/0119710 | A1 * | 8/2002 | Mello | H01R 4/5083 439/783 |
| 2003/0007831 | A1 * | 1/2003 | Lian | E02F 9/2841 403/374.1 |
| 2005/0034356 | A1 * | 2/2005 | Blette | A01K 91/047 43/44.9 |
| 2005/0039376 | A1 * | 2/2005 | Blette | A01K 91/047 43/43.1 |
| 2008/0104805 | A1 * | 5/2008 | Cameron | F16B 21/088 24/346 |
| 2009/0198236 | A1 * | 8/2009 | Steiner | A61B 17/62 606/59 |
| 2009/0298358 | A1 * | 12/2009 | Tamm | H01R 4/52 439/863 |
| 2010/0191257 | A1 * | 7/2010 | Boulnois | A61B 17/1285 606/143 |
| 2011/0183539 | A1 * | 7/2011 | Gaertner | H01R 4/28 439/345 |
| 2012/0104749 | A1 * | 5/2012 | Kang | F16L 37/0925 285/323 |
| 2013/0014427 | A1 * | 1/2013 | Rothan | A01K 91/03 43/43.1 |
| 2014/0202060 | A1 | 7/2014 | Ohashi et al. | |
| 2014/0273599 | A1 * | 9/2014 | O'Sullivan | H01R 4/4872 439/370 |
| 2014/0273609 | A1 * | 9/2014 | Diop | H02G 1/14 439/489 |
| 2014/0273610 | A1 * | 9/2014 | Diop | H01R 13/641 439/491 |
| 2015/0107875 | A1 * | 4/2015 | Diop | H01R 4/4872 174/135 |
| 2016/0006139 | A1 * | 1/2016 | Diop | H01R 4/5083 439/880 |
| 2017/0373452 | A1 * | 12/2017 | Diop | H01R 4/52 |

* cited by examiner

KNOTLESS LINE ATTACHMENT APPARATUS

CROSS REFERENCE TO RELATED APPLICATIONS AND INCORPORATION BY REFERENCE

This non-provisional patent application is a non-provisional of provisional application Ser. No. 62/747,111 titled "Knotless fishing hook and lure attachment apparatus", which was filed in the United States Patent and Trademark Office (USPTO) on Oct. 17, 2018, which is hereby incorporated by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to systems and methods for attaching the ends of lines, wires, ropes or other elongated structures together. Specifically, the invention relates to an apparatus and method for attachment of a first line end to a second line end, without the need for the tying of a knot securing the first line end and second line end. An exemplary, non-limiting use case is the case in which a fishing hook having a line portion is attached to a fishing line disposed on a fishing rod and reel. It is to be understood, however, that the line attaching apparatus and method of the invention is applicable to any use in which it is desired to attach the ends of lines, wires or ropes together or to a structure.

2. Background Art

There are many situations in which it is desired to attach a first end of a line to a second end of the same or a different line. In these situations one solution of the prior art is to tie the first and second ends together using a knot, such as a square knot or other knot as may be known in the art. In other situations, a first and a second end of the line may be attached together using a splice. Splices of the prior art may take several forms such as, for example in the case in which the lines are multi-stranded lines, unraveling the strands of each of the first and second end for a short distance along each line, intertwining the loose strands of each of the first and second end together, and in overlaying the splice section with a protective covering that may also be utilized to keep the intertwined strands from unraveling. Other splicing techniques may use tubular links of flexible or rigid material that contain chemical adhesive material inside the tubes. In such cases the first and second end may be inserted into a first and second end of such a tubular splice, and chemical adhesive material inside the tube may be caused to flow around the first and second end using heat or some other method, bonding the first and second ends to the interior tube wall and therefore creating a connection between the first and second ends.

Each of the aforementioned methods for joining first and second line ends together have specific shortcomings. In the case of knot tying, a lack of manual dexterity, gloves, physical disabilities, neurologic disorders, extreme weather or temperature, and other obstacles may make it difficult or even impossible for a person to effectively tie a knot attaching two line ends together. In the case of splicing, additional tooling may be required, such as in the case in which splicing is achieved by crimping the ends of a splice section to each of the line ends. In the case of chemical splicing, additional tooling may be required in the form of heat guns or chemical adhesive application devices in order to achieve the desired chemical bond between the ends inside the splice tube.

In many situations, it may be desired that small children be able to effectively join a first end of a line to a second end of a line in order to achieve a secure connection between the first and second line ends. One example of such situation is the case in which a small child is fishing using a fishing line. As is well known, it is often the case in which it is desired to attach a first end of the line to a second end of the line while fishing. Such cases include the case in which it is desired to attach a hook onto a fishing line forming a part of a rod and reel fishing pole, or the case in which it is desired to attach a hook onto a fishing line which forms a part of a non-reel fishing poles such as the common use of a cane pole in which the fishing line is simply attached to a distal land of the cane pole while a proximal end of the cane pole is held in the hands of the person fishing. There are many other examples in which it may be desired to attach the first end of a line to a second end of the line such as instances in which lines are used for clotheslines, the setting up of tenants such as when camping, joining two lines together to make a longer line, and many other examples. In each of these cases it may be desired to join a first end of a line and a second end of the line without the need for additional tooling or use of chemical adhesives or the like.

It may also be desired in many cases to be able to detach a first end of a line and a second end of the line that have been joined together. In such cases, a spliced line may be impossible to detach. And in other cases, knots that have been used to attach a first end of a line and a second end of the line may become overly tightened to the point where it may be impossible to untie them, requiring cutting the line.

What is needed in the art, therefore, is an apparatus and/or method adapted to attach a first end of a line in the second end of the line together without the need for tying a knot between the first line end and second line end, tooling, chemical adhesives, crimping or the like. What is furthermore needed in the art is a method and system for attaching a first end of the line to a second end of the line that may also allow easy detachment of the first end of a line to a second end of the line.

BRIEF SUMMARY OF THE INVENTION

The present invention comprises an apparatus and method that have one or more of the following features and/or steps, which alone or in any combination may comprise patentable subject matter.

The present invention overcomes the shortcomings of the prior art in that it provides a system and method for attaching a first end of a line to a second end of a line without the need to tie a not attaching the first end in the second end. In an embodiment, the device of the invention comprises a hollow main body, which may be but is not necessarily tubular in cross-section. The hollow main body may be capped on either end by a first end cap and second end cap. An end of a first line end portion to be attached may be inserted into an opening in the first and cap. Likewise, an end of a second line end portion to be attached may be inserted into an opening in the second end cap. Within the hollow main body, each of the line ends pass into and through a collet having an opening there through, one collet for each line end. A first end of each collet comprises a conically-shaped section, with a portion of the collet material in the region of the conically-shaped section removed forming a void in the conically shaped section of the collet, allowing the conically shaped section to be deformed when acted upon by a force or forces transverse to the collet axis, such as a squeezing force. Each collet may be disposed within a collet housing comprising a conically shaped opening that may be complementary in shape to the conically-shaped exterior section of the collet, and is designed to receive the conically-shaped exterior section of collet. The collet housing is subject to a biasing force that tends press the collect housing towards the conically-shaped section of the collet, causing the conically-shaped exterior section of the collet to be deformed slightly, reducing the size of the collet void. The biasing force may be provided by a compression spring that is under compression, and which therefore exerts a biasing force pushing the conically-shaped exterior section of the collet into the conically shaped opening in the collet housing as the spring tends to expand back into its relaxed state. The compression spring may be in direct or indirect contact with structure forming a part of, or in communication with, the collet on one end (such structure may be, for example, an E ring such as depicted by items 214 and 414 in the figures), and with a surface of the collet housing on the other end, such that it provides a force tending to push the collet housing further along the collet, forcing the collet void to be reduced and to be compressed against a line end portion passing through the collet such that the line end portion is captured or retained in a tight or press fit within the collet opening and is prevented from translating along the collet opening with the collet.

The first line end portion and second line end portion may each be of a dimension that is equal to or larger than the collet void, so that when the collets of the invention are in a line retention state a line end portion passing through the collet is captured or retained in a tight or press fit within the collet void and is prevented from translating along the collet opening, and when the collets of the invention are in a line insertion/removal state a line end portion passing through the collet is allowed to slide, or translate, freely within the collet void such that a line end portion may be inserted into the collet in the case of attaching the line attaching apparatus to a line, or removed from the collet in the case of removing the line attaching apparatus from a line.

The present method and device of the invention overcome the shortcomings of the prior art by providing an apparatus and/or method that operates to attach a first end of a line in the second end of the line together without the need for tying a knot between the first line end and second line end, tooling, chemical adhesives, crimping or the like; and, further, allows quick and easy detachment of the first end of a line to a second end of the line without the need to untie knots or sever the line ends. This allows use of the invention in situations in which it may be difficult to untie knots such as when the user is wearing gloves, or if the user is physically disabled to a disorder such as a muscular or neurologic disorder, or has poor vision such that it is difficult for the user to visualize the knot to be untied.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings.

In the figures, like callout numbers refer to like elements.

DETAILED DESCRIPTION OF THE INVENTION

The following documentation provides a detailed description of the invention.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal and structural equivalents, and not merely by the preferred examples or embodiments given.

As used herein, "line" includes within its meaning any length of cord, rope, wire, or monofilament, including both single strand and multi-stranded structures, of any diameter or outer shape, without regard to the material comprising the line. Thus, any material from which line may be fabricated or formed is included within the scope of this disclosure. "Line" includes within its meaning any structure that is flexible or on any structure that is able to pass through the collet opening(s), even if the structure is non-flexible. Thus "line" may comprise any material such as, but not limited to, plastic, metal, fiber material, or any material.

As used herein, "lengthwise" and "axially" mean running along axis B as depicted in the figures.

Items designated as "optional" may, but do not necessarily, form a part of the claimed invention.

Figure 1:
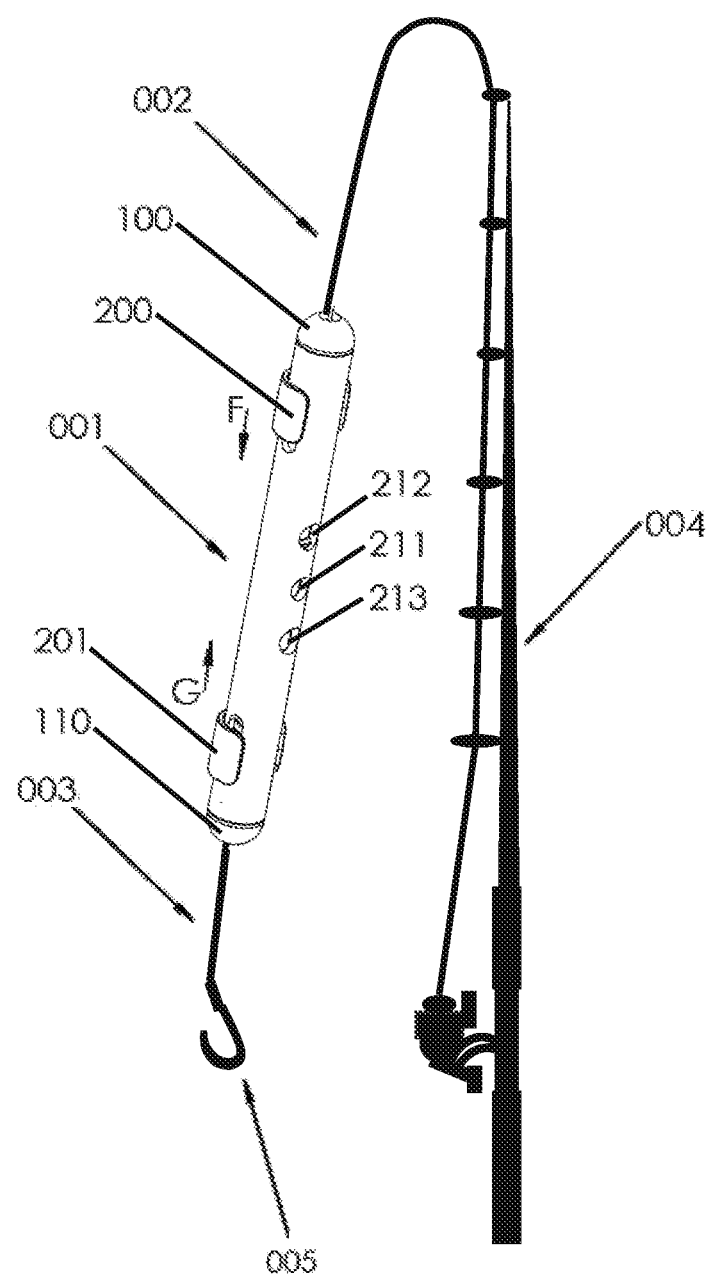
FIG. 1 depicts a perspective view of an exemplary use of an embodiment of the invention directed to attaching two line ends together to form a completed attachment of a hook having a first line end to a fishing line having a second line end.

Referring now to FIG. 1, a perspective view of an exemplary use of an embodiment of the invention 001 directed to attaching two line ends together to form a completed attachment of a fishing line having a first line end 002 attached to a hook 005 having a second line end 003 is depicted. In this exemplary, non-limiting use, a fishing pole 004 which comprises fishing line ending in first line end 002 is depicted for reference. In this embodiment, a typical method of use of the invention is 1) applying a motivating force to motivate first plunger grip 200 against the biasing force R of first compression spring 112 (shown in FIGS. 3, 4A, 4B and 5) in the direction depicted by F such that the line attaching apparatus first portion O (depicted in FIG. 2) is placed into a line insertion/removal state; 2) while line attaching apparatus first portion O is in a line insertion/removal state, insert first line end 002 into end cap 100 until it passes through first collet 105 (see FIG. 4A) and becomes visible in center either window 211 or first spacer snap receiver hole 212; 3) release the motivating force on first plunger 200, allowing it to return to its original state and placing the line attaching apparatus first portion O back into a line retention state in which first line end 002 is retained by a squeezing force on first collet 105 (shown in FIG. 3); and repeating this process for the second line end from the other end of the line attachment apparatus, namely: 4) applying a motivating force to motivate second plunger grip 201 against the biasing force of second compression spring 312 (shown in FIG. 4A) in the direction depicted by G such that the line attaching apparatus second portion P (depicted in FIG. 2) is placed into a line insertion/removal state; 2) while line attaching apparatus second portion P is in a line insertion/removal state, insert second line end 003 into end cap 110 until it becomes visible in either center window 211 or second spacer snap receiver hole 213; 3) release the motivating force on second plunger 201, allowing it to return to its original state and placing the line attaching apparatus second portion P into a line retention state in which second line end 003 is retained by a squeezing force on second collet 305 (shown in FIG. 3). In this manner, first line end 002 and second line end 003 are quickly and easily attached, without the need for tying knots such that fine manual dexterity or visual acuity are not needed to complete the attachment, such that hook 005 is effectively and efficient attached to the line of fishing pole 004. While the exemplary method and use described herein is that of attaching a fishing element to a fishing line, it is within the scope of the claimed invention that the method and use of the invention is applicable to any use directed to attaching an apparatus to a line, or attaching two line ends together, without limitation.

A method of removing a line end from a line attaching apparatus of the invention follows a reverse procedure to that described above. Namely, the line attaching apparatus first portion O is placed into a line insertion/removal state by operation of the first plunger grip 200 as described above, and first line end 002 is pulled from the line attaching apparatus first portion O by pulling in a direction opposite to A (see FIG. 2); and; likewise, line attaching apparatus second portion P is placed into a line insertion/removal state by operation of the second plunger grip 201 as described above, and second line end 003 is the pulled from the line attaching apparatus first portion O by pulling in a direction opposite to E (see FIG. 2).

Figure 2:
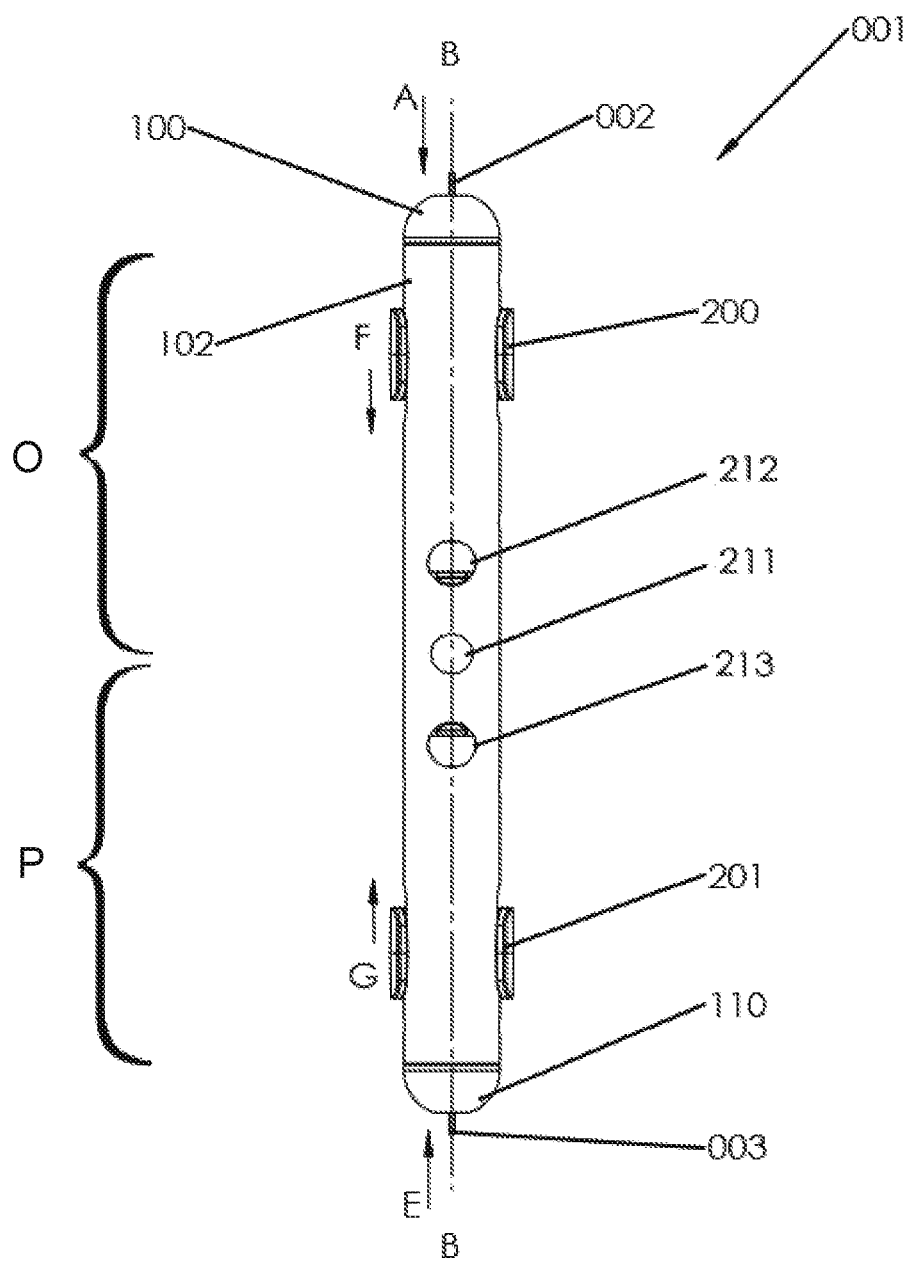
FIG. 2 depicts a front view of an embodiment of the invention.

Referring now to FIG. 2, a front view of an embodiment of the line attaching apparatus of the invention is depicted. In this exemplary embodiment, the line attaching apparatus comprises two sections: a line attaching apparatus first portion O for receiving first line end 002 inserted along direction A, and a line attaching apparatus second portion P for receiving a second line end 003 inserted along direction E. First spacer snap receiving hole 212 and second spacer snap receiving hole 213 are for receiving spacer retainer clips 301 which form a part of spacer 300 (not depicted in FIG. 2 but depicted in FIG. 12) for retaining spacer 300 in place inside hollow main body 102. Window 211 may be utilized to observe that first line end 002 and second line end 003 are inserted a desired distance into first collet 105 and second collet 305, respectfully; namely, that the first line end 002 has been inserted all way through the axial opening in first collet 105 such that first line end 002 has passed through first collet 105 and is visible in window 211, and that the second line end 003 has been inserted all way through the axial opening in second collet 305 such that second line end 003 has passed through second collet 305 (depicted in FIG. 3) and is visible in window 211. End caps 100 and 110, first plunger grip 200 and second plunger grip 201 are shown for reference. Direction of first plunger grip movement F towards placing line attaching apparatus first portion O in a line insertion/removal state, and second plunger grip movement G towards placing line attaching apparatus second portion P in a line insertion/removal state are also shown for reference.

Figure 3:
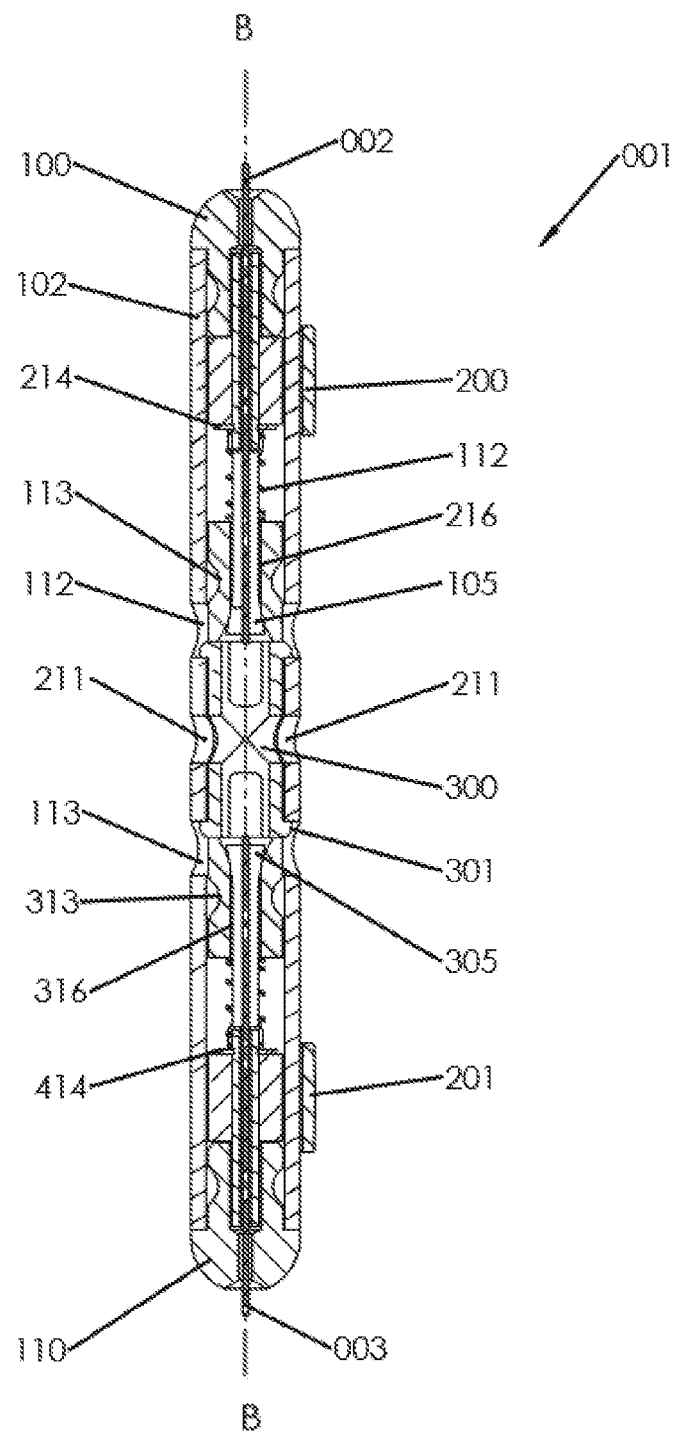
FIG. 3 depicts a cross section view of an embodiment of the invention in a line retention state, in which the line attaching apparatus effectively forms a completed attachment of a first line end to a second line end.
Figure 4A:
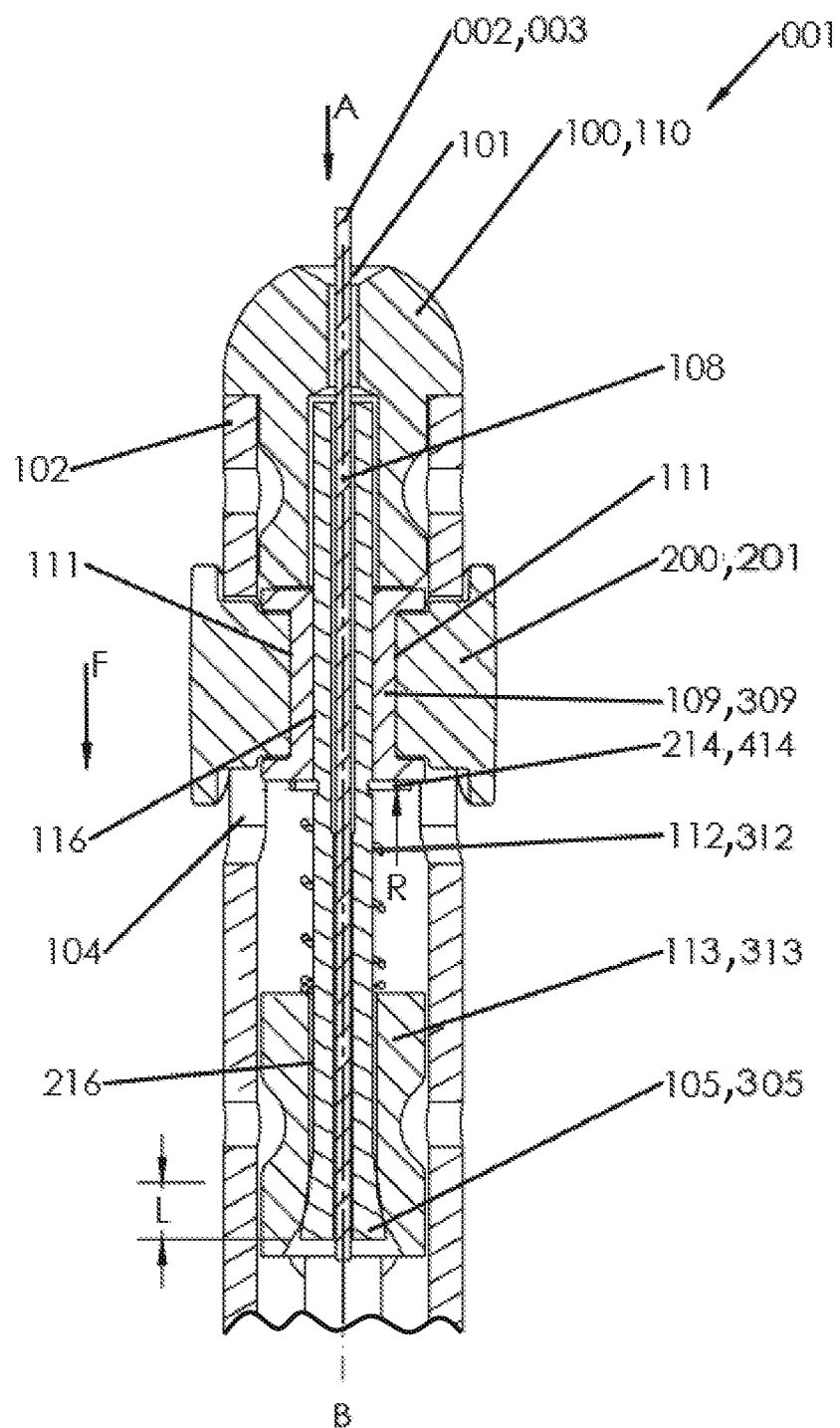
FIG. 4A depicts a cross view of a portion of an embodiment of the invention depicting the relationship between the plunger, plunger grip, collet, collet housing, compression spring, E-ring, and main body in a line retention state.

Referring now to FIGS. 3, and 4A, cross section views of an embodiment of the invention in a line retention state, in which the line attaching apparatus effectively forms a completed attachment of a first line end portion to a second line end portion is depicted. Hollow main body 102 may have an axis B, a first end at optional first end cap 100 and a second end at optional second end cap 110. The invention may comprise a line joining apparatus first portion O and line joining apparatus second portion P (shown in FIG. 2) that have collets 105, 305 respectively, each with an opening 108 there through for passing a line end portion 002, 003 through collets 105, 305. Collets 105, 305 may also have a conically-shaped exterior portion 401 (see FIG. 14) that is received by a conically shaped opening J in collet housings 113, 313 respectively (see FIG. 4B). The conically-shaped exterior portion 401 of collets 105, 305 may each a have void 400 allowing the conically shaped portion 401 to deform when collet conically shaped portion 401 is subjected to a squeezing force acting transverse to axis B such that the collet void 400 is reduced in cross section. Each of collet housings 113, 313 may have an opening 216 there through allowing collet 105, 305 to pass through collet housing opening 216 such that collet housing 113, 313 is slidingly engaged on collet 105, 305, respectively. Collet housing 113, 313 conical opening J may receive conical exterior section 401 of collet 105, 305 in a complementary fit. Plunger 109, 309 may also have an opening 116 allowing collet 105, 305 to pass through plunger 109, 309 respectively.

Still referring to FIGS. 3, and 4A, optional end cap 100, 110 may each have an axial opening there through 103 (see FIG. 6) sized to receive a line end portion 002, 003 in a sliding engagement. Collet 105, 305 may also have an axial opening 108 sized to receive a line end portion 002, 003 respectively in a sliding engagement, allowing line end portions 002, 003 to pass through collet 105, 305, respectively, when line joining apparatus portion O, P is in a line insertion/removal state. Compression springs 112, 312 may provide a biasing force R between plungers 109, 309, respectively and collet housings 113, 313, respectively as compression springs 112, 312 respectively tend to expand axially.

In a line retention state, compression springs 112, 312 are at least partially compressed such that a biasing force R pushes collet housings 113, 313 along first collet 105, 305, respectively, resulting in a squeezing force on collets 105, 305 conically shaped section 401, deforming first collet conically shaped external portion 401 such that the first collet void 400 is reduced in size and tightens against line end portions 002, 003 respectively resulting in a friction fit between line end portions 002, 003 and the surfaces of void 400 that prevents line end portions 002, 003 from being translated within collets 105, 305. FIGS. 3 and 4A depict a line retention state.

Figure 4B:
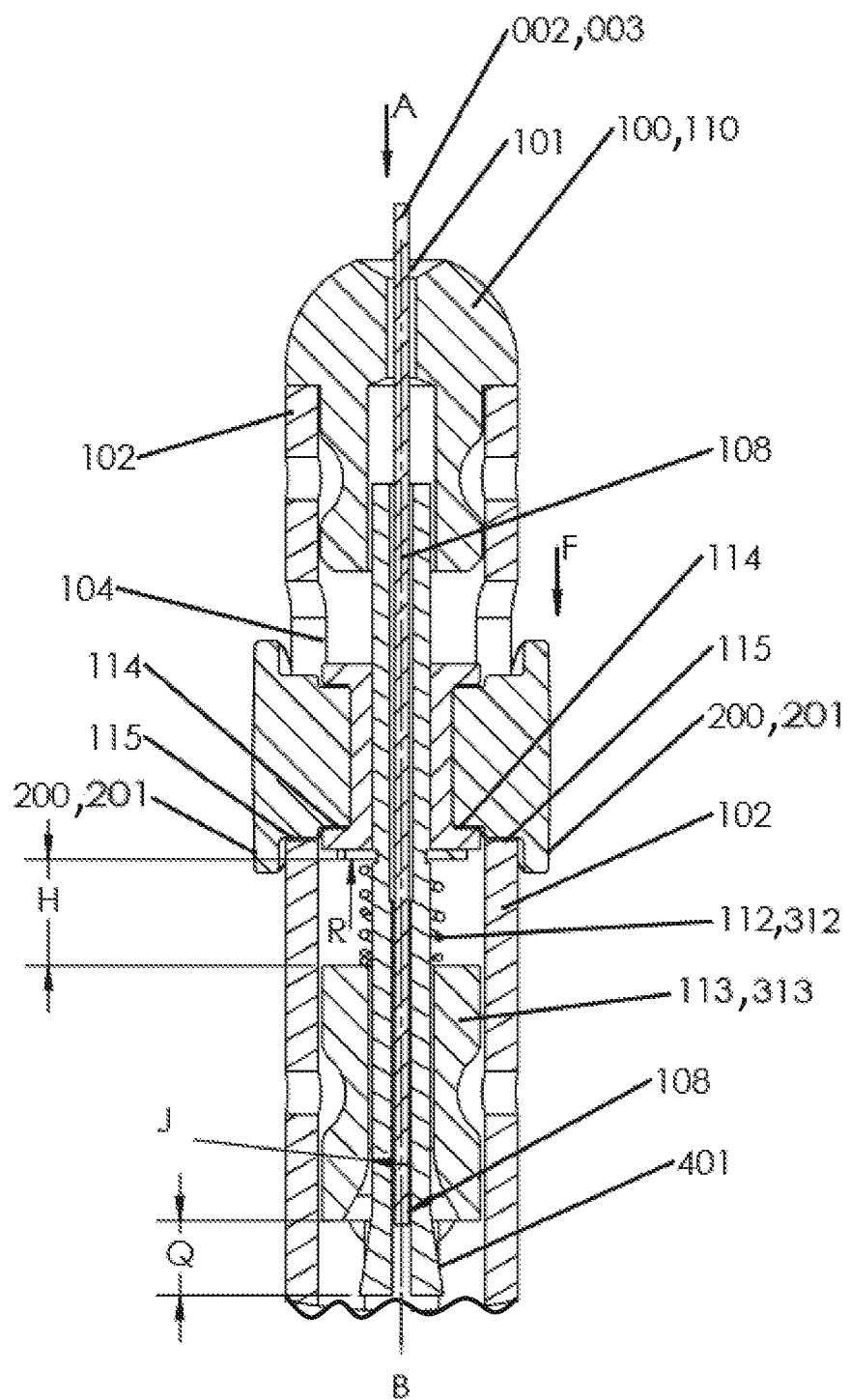
FIG. 4B depicts a cross view of a portion of an embodiment of the invention depicting the relationship between the plunger, plunger grip, collet, collet housing, compression spring, E-ring, and main body of the invention in a line insertion/removal state.

Referring now to FIGS. 4A and 4B, plunger grips 200, 201 may be in communication with plungers 109, 309 by the insertion of at least one plunger grip second protrusion 115 from each of plunger grips 200, 201 into at least one receiving opening 111 in plungers 109, 309, respectively. At least one plunger grip second protrusion 115 may also pass through at least one main body plunger opening 104, 304 (see FIG. 9) in main body 102. End caps 100, 101 may each comprise a beveled recess 101 to allow easier insertion of line end portions 002, 003, respectively into the line attachment apparatus. In embodiments, first line end portion 002 may be inserted into the line attachment apparatus from direction A through optional end cap 100 opening 103, and second line end portion may be inserted into the line attachment apparatus from direction E through optional end cap 110 opening 103. E ring 214, 414 may be snapped into E ring groove 215, 415 in collet 105, 305 to provide a surface in communication with compression spring 112 in order to provide the biasing force R.

Referring now to FIG. 4B, a cross section of a portion of an embodiment of the invention in a line insertion/removal state is depicted. In a line insertion/removal state, plungers 109, 309 (shown in FIG. 4B and called out in FIG. 4A) and said collets 105, 305 are motivated towards said first collet housings 113, 313, respectively, against biasing force R, compressing compression springs 112, 312, respectively to a greater degree than when the line joining apparatus is in a line retention state, motivating collets 105, 305s's external conically shaped portions 401 away from said collet housing 113, 313's conically shaped receiving portion J, removing the squeezing force from collet housing 113, 313's conically shaped receiving portion J and allowing collet conically shaped exterior portion 401 to expand back towards an original state in which the collet void 400 expands, removing the press fit on line end portions 002, 003 and allowing the line end portions 002, 003 to translate, or slide, freely within the collet void 400. When the line attaching apparatus is in a line insertion/removal state, collets 105, 305 may extend beyond the extent of collet housings 113, 313 by a distance Q as depicted in FIG. 4B, for as long as first plunger 109 is motivated against biasing force R, keeping the line attaching apparatus in a line insertion/removal state.

The invention may also comprise a line joining apparatus second portion P that is identical in its constituent components to line joining apparatus first portion O. Thus, likewise as described above regarding line joining apparatus first portion O, line joining apparatus second portion P may have an optional second end cap 110 comprising an opening there through for passing second line end portion 003 through second end cap 110. Optional second end cap 110 may be disposed in a second end of hollow main body 102. Second collet 305 may have opening there through for passing a second line end portion 003 through second collet 305. Second collet 305 may also have a conically-shaped exterior portion 401 (see FIG. 14) that is received by a conically shaped opening in second collet housing 313. The conically-shaped exterior section 401 of second collet 305 may have a void 400 allowing the conically shaped section to deform when the second collet conically shaped exterior section 401 is subjected to a squeezing force such that the second collet void 400 is reduced in cross section. Second collet housing 313 may have an opening 216 there through allowing second collet 313 to pass through second collet housing opening 216 such that second collet housing 313 is slidably engaged on second collet 305, second collet housing 313 conical opening receives conical exterior section of second collet 305. Second plunger 309 may also have an opening 116 allowing second collet 305 to pass through second plunger 309.

Optional second end cap 110 may have an opening there through sized to receive a second line end portion 002 in a sliding engagement. Second collet 305 may also have an opening sized to receive a second line end portion 003 in a sliding engagement, allowing second line end portion 003 to pass through second collet 305, when line joining apparatus second portion P is in a line inserting state. Second compression spring 312 may provide a biasing force R between second plunger 309 and second collet housing 313 as second compression spring 312 tends to expand axially.

In a line retention state, second compression spring 312 is at least partially compressed such that a second biasing force R pushes second collet housing 313 along second collet 305, resulting in a squeezing force on second collet conically shaped external section 401, deforming first collet conically shaped portion 401 such that the first collet void 400 is reduced in size and tightens against second line end portion 003 in a friction fit that prevents second line end portion 003 from being translated within second collet 305.

Second plunger grip 201 may be in communication with second plunger 309 by the insertion of at least one second plunger grip protrusion 114 into at least one receiving opening 111 in first plunger 309. At least one second plunger grip protrusion 114 may also pass through at least one main body plunger opening 104 in main body 102. Second end cap 110 may comprise a beveled recess 101 to allow easier insertion of second line end portion 003 into the line attachment apparatus. In embodiments, second line end portion 003 may be inserted into the line attachment apparatus from direction E through an axial opening though optional second end cap 110. Second E ring 414 may be snapped into second E ring groove 415 in second collet 305 to provide a surface in communication with second compression spring 312 in order to provide the biasing force R.

The line attaching apparatus second portion P operates in the same fashion as attaching apparatus second portion O as shown in FIG. 4B and described above. In a line insertion/removal state, second plunger 309 and second collet 305 are motivated towards second collet housing 313, compressing second compression spring 312 to a greater degree than when the line joining apparatus is in a line retention state, motivating second collet 305's external conically shaped portion 401 away from said second collet housing 313's conically shaped receiving portion, removing the squeezing force from second collet housing 313's conically shaped receiving portion and allowing collet conically shaped exterior portion 401 to expand back towards an original state in which the second collet void 400 expands, allowing the second line end portion 003 to translate, or slide, freely within the second collet void 400. When the line attaching apparatus is in a line insertion/removal state, second collet 305 may extend beyond the extent of second collet housing 313 by a distance Q as depicted in FIG. 4B, for as long as second plunger 309 is motivated against biasing force R.

The first collet 105 and second collet 305 conically shaped external portions may extend along the collet for a length L as shown in FIG. 4A.

Figure 5:
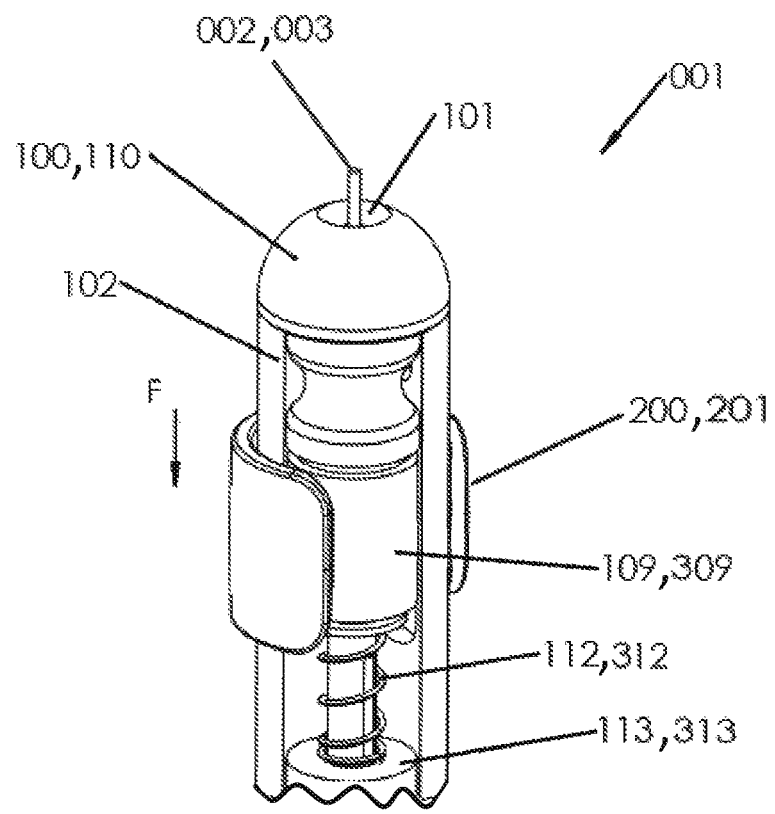
FIG. 5 depicts a perspective view of an embodiment of the invention with hollow main body cut away for clarity, depicting the relationship between the end cap, plunger, compression spring and an upper portion of the collet housing in contact with first compression spring.

Referring now to FIG. 5, a cross section view of a portion of an embodiment of the invention, depicting the relationship between end caps 100, 110; collets 105, 305; plunger grips 200, 201; compression springs 112, 213; hollow main body 102, plungers 109, 309; collet housing 113, 313; and line ends 002, 003 is depicted. Arrows F, G depict the direction of travel of plunger grips 200, 201 when using plunger grips 200, 201 to motivate plungers 109, 309 to place the line attachment apparatus in a line insertion/removal state.

Figure 6:
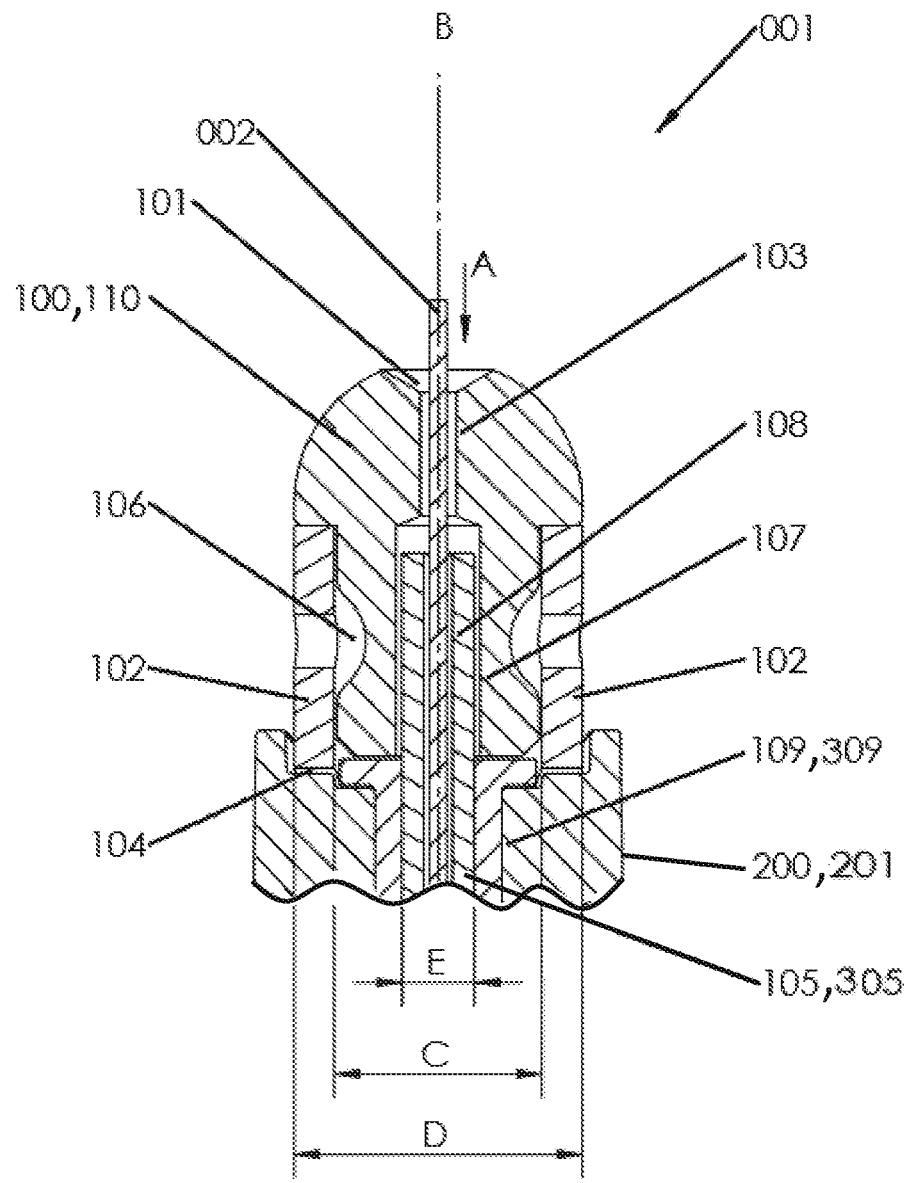
FIG. 6 depicts a cross section view of a portion of an embodiment of the invention, depicting the relationship between end cap, collet, plunger grip, hollow main body, plunger and line end.

Referring now to FIG. 6, a cross section view of a portion of an embodiment of the invention, depicting the relationship between end caps 100, 110; collet 105, 303; plunger grip 200, 201; hollow main body 102, plunger 109, 309 and line ends 002, 003, respectively, is depicted. 103 is the opening in optional first end cap 100 and second end cap 110 that allows passage of line end portions 002 and 003, respectively, through first end cap 100 second end cap 110. End caps 100 and 110 may each comprise bevels 101 that facilitate the insertion of line end portions into the end caps. Recess 106 in end caps 110, 110 may be present in either or both end caps 100 and 110 in order to facilitate assembly and use of the line attaching apparatus of the invention. In an embodiment, recess 106 may provide a recess into which the adjacent side wall of main body 102 may be deformed during a crimping operation for securing said main body 102 to end caps 100 and 110. First line end portion 002 may pass through first collet 105, and second line end portion may pass through second collet 305, via axial opening 108 in both first collet 105 and second collet 305. First end cap 100 and second end cap 110 may have a recess 107 for receiving an end of first collet 105 and second collet 305, respectively. Main body 102 may have an opening 104 allowing at least one plunger grip protrusion 114 to pass through the sidewall of main body 102 as shown in FIG. 4B.

Figure 7:
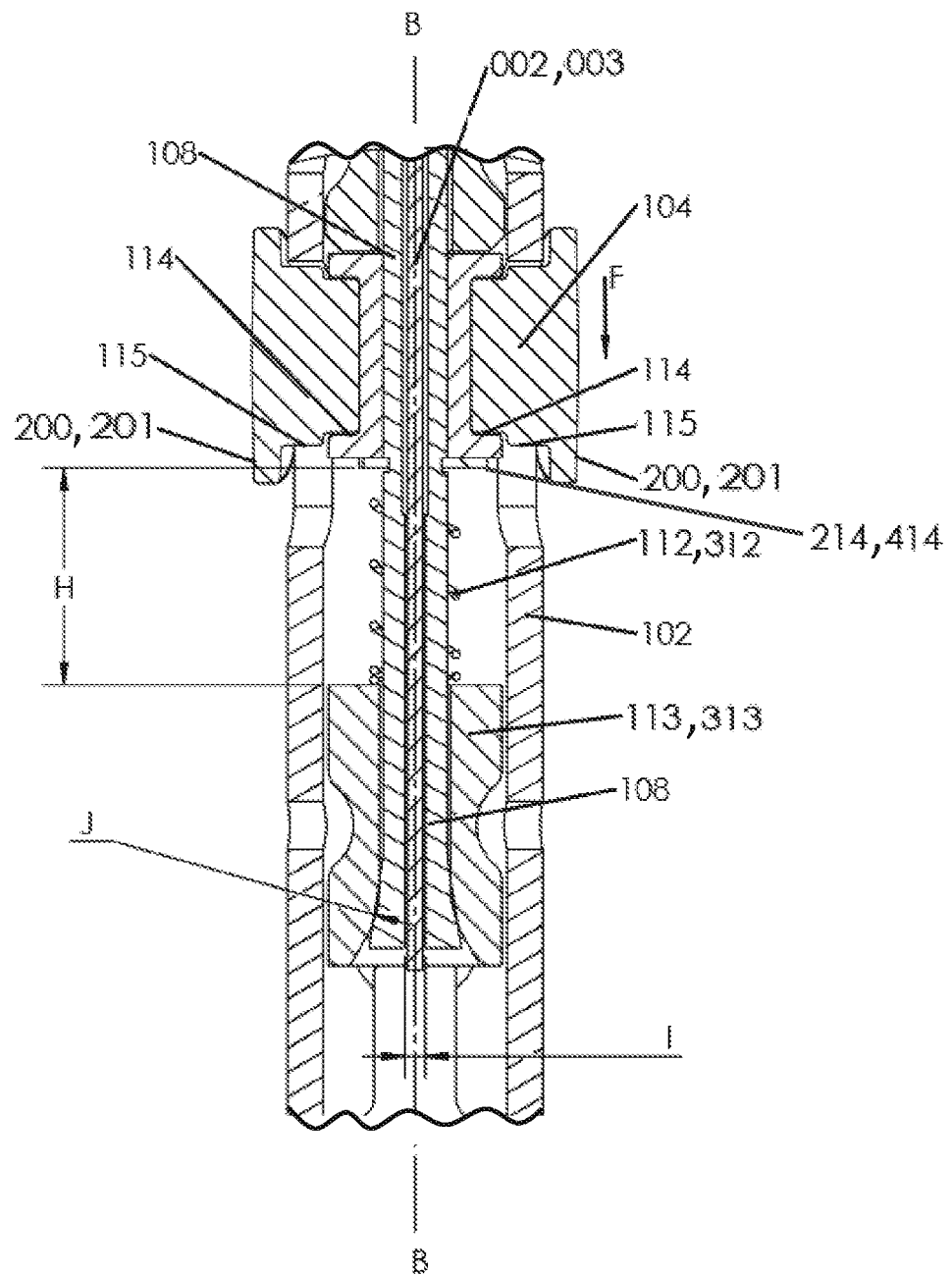
FIG. 7 depicts a cross section view of a portion of an embodiment of the invention, depicting the relationship between collet, collet housing, hollow main body, compression spring, and E ring.

Referring now to FIG. 7, a cross section view of a portion of an embodiment of the invention, depicting the relationship between collets 105, 305, collet housings 113, 313, hollow main body 102, compression springs 112. 312 and E rings 214, 414 is depicted. Plunger grips 200, 201 may be in communication with plungers 109, 309 by the insertion of at least one plunger grip protrusion 114 into at least one receiving opening 111 in plungers 109, 309. In an embodiment, first plunger grip 200 comprises two plunger grip protrusions 114 that are each inserted in to a complementary matching receiving opening 111 in first plunger 109, and second plunger grip 201 comprises two plunger grip protrusions 114 that are each inserted in to a complementary matching receiving opening 111 in second plunger 309. At least one plunger grip protrusion 114 may also pass through at least one main body plunger opening 104 in main body 102. Plunger grips 200, 201 are shown in a line retention state in FIG. 7, but, as depicted in FIG. 4B, they may be motivated in the direction F or G such that they motivate plungers 109, 309, respectively, against biasing force R to place said collets 105, 305, respectively in a line insertion/removal state as shown in FIG. 4B. The conically shaped exterior portion 401 of collets 105, 305 may be in contact with the conically shaped opening J in collet housings 113, 313, respectively, when the line attaching apparatus is in a line retention state as shown in FIG. 7.

Figure 8:
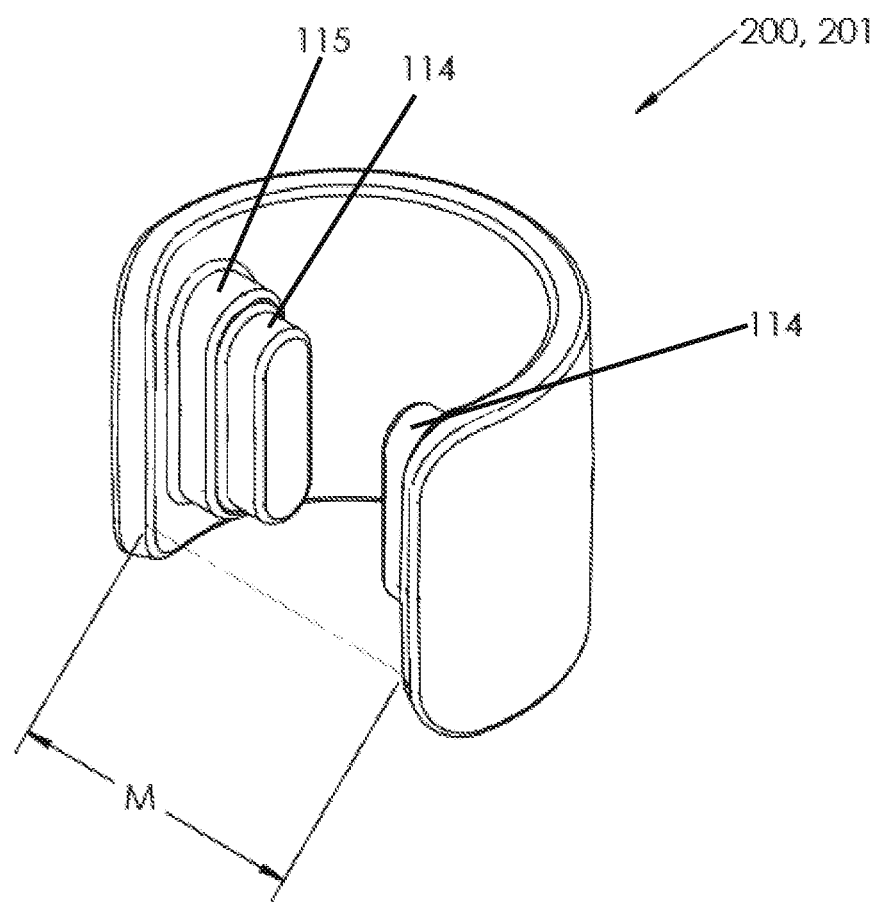
FIG. 8 depicts a perspective view of an embodiment of a plunger grip 200 or 201 of an embodiment of the invention.

Referring now to FIG. 8, a perspective view of an embodiment of a plunger grip 200, 201 of an embodiment of the invention is depicted. At least one plunger grip first protrusion 115 and at least one second protrusion 114 are shown for reference. Plunger protrusions 114 and 115 may form a plunger protrusion pair. Plunger grips 200, 201 may each comprise at least one, but preferably a plurality, of protrusion pairs 114 and 115. Opening M is of sufficient dimension that it may be manually enlarged, allowing plunger grip 200, 201 to be placed around an outer surface of main body 102, and then plunger grip 200, 201 may be allowed to snap back into its original shape such that it surrounds an outer surface of main body 102, as shown in FIGS. 1 and 2. Plunger grips 200, 201 may be manufactured from any material including but not limited to plastics, metals, phenolics, or any other material that has sufficient spring that it returns to its original shape as depicted in FIG. 8 after being manually spread apart so that it may be placed around an outer surface of main body 102.

Figure 9:
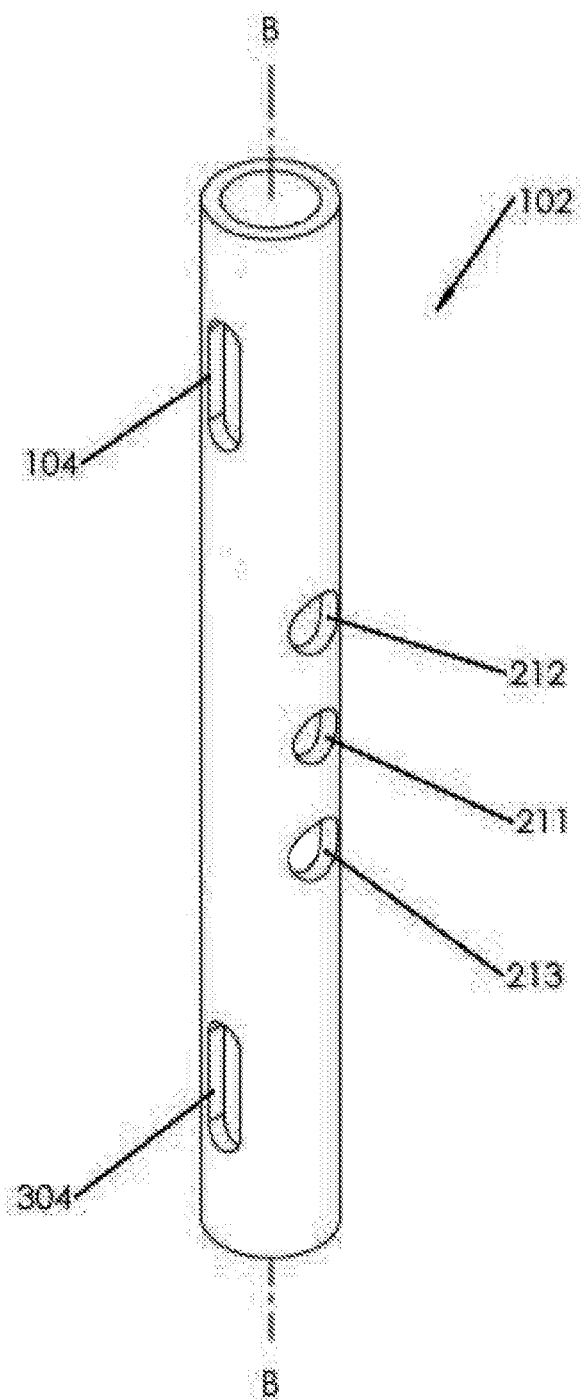
FIG. 9 depicts a perspective view of an embodiment of a hollow main body 102 of an embodiment of the invention.

Referring now to FIG. 9, a perspective view of an embodiment of a hollow main body 102 of an embodiment of the invention is depicted. Main body 102 may be any cross sectional shape, including but not limited to a circular cross section. It is only depicted as circular in cross section in the drawings for ease of viewing. In an embodiment, main body 102 may be a hollow tube. Plunger openings 104, 304 allow the passage of plunger grip 200, 201 protrusions 114, 115 to pass through main body 102 sidewall so that at least one plunger grip protrusions 114 may engage at least one plunger grip receiving openings 111 in plungers 109, 309. First spacer snap receiving hole 212 and second spacer snap receiving hole 213 may pass completely through main body 102 to provide openings in main body 102 to receive spacer retaining clips 301 in a snap fit, securing spacer 300 inside main body 102 as depicted in FIG. 3. Window 211 provides visibility for a user to observe that first line end portion 002 has been inserted into collet 105 to the point that it extends all the way through collet 105 such that it may be observed through window 211, and likewise window 211 provides visibility for a user to observe that second line end portion 003 has been inserted into collet 305 to the point that it extends all the way through collet 305 such that it may be observed through window 211.

Figure 10:
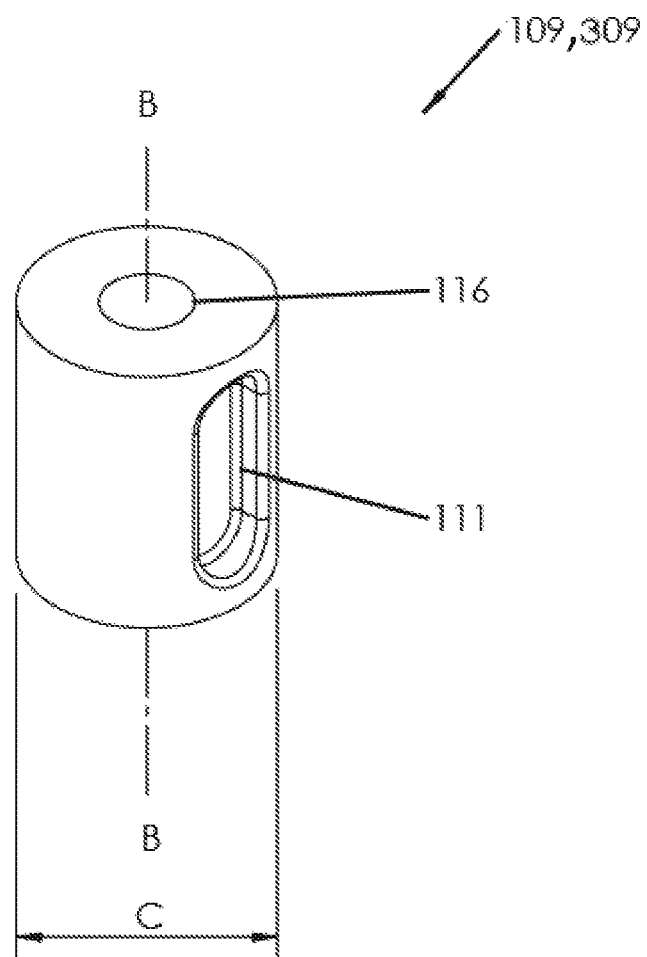
FIG. 10 depicts a perspective view of an embodiment of a plunger 109 or 309 of an embodiment of the invention.

Referring now to FIG. 10, a perspective view of an embodiment of a plunger 109 or 309 of an embodiment of the invention is depicted. Plunger 109, 309 may comprise an axial opening 116 there through, allowing collet 105, 305, respectively, to pass through. Plunger 109, 309 may also comprise at least one plunger grip receiving opening 111 for receiving at least one plunger grip protrusion 114, securing plunger 109, 309 to plunger grip 200, 201, respectively. In embodiments, plunger 109, 309 may each be defined by an axis B.

Figure 11:
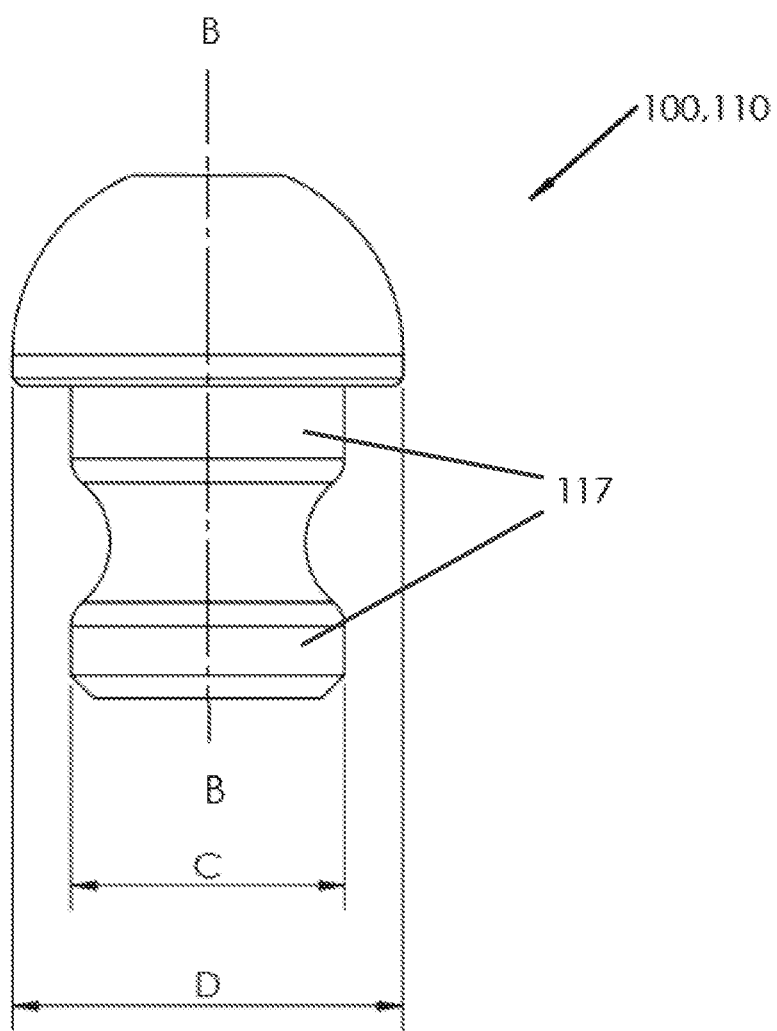
FIG. 11 depicts a side view of an embodiment of an end cap 100 or 110 of an embodiment of the invention.

Referring now to FIG. 11, a side view of an embodiment of an end cap 100 or 110 of an embodiment of the invention is depicted. In an embodiment, end cap 100 and 110 may be defined by an axis B, and may be characterized by a body feature 117 of dimension C that extends into main body 102. In an embodiment, dimension C is complementary to an inner dimension of hollow main body 102 such that body feature 117 of end cap 100 or 110 is captured in a press fit in main body 102. In embodiments, body feature 117 of end cap 100 or 110 may be chemically bonded to an inner surface of main body 102 with an adhesive. Alternatively body feature 117 of end cap 100 or 110 may be attached to main body 102 by any means in the art such as crimping, welding, mechanical fasteners or any other means. In an embodiment, dimension D is an outer dimension of end cap 100 or 110, and may match an outer dimension of main body 102. In an embodiment, main body 102 may be circular in cross section, forming a hollow tube having an inner diameter C and an outer diameter D, and end caps 100 and 101 and body feature 117 may be circular also in cross section, where C is the diameter of body feature 117, and D is the outer diameter of end cap 100 or 110.

Figure 12:
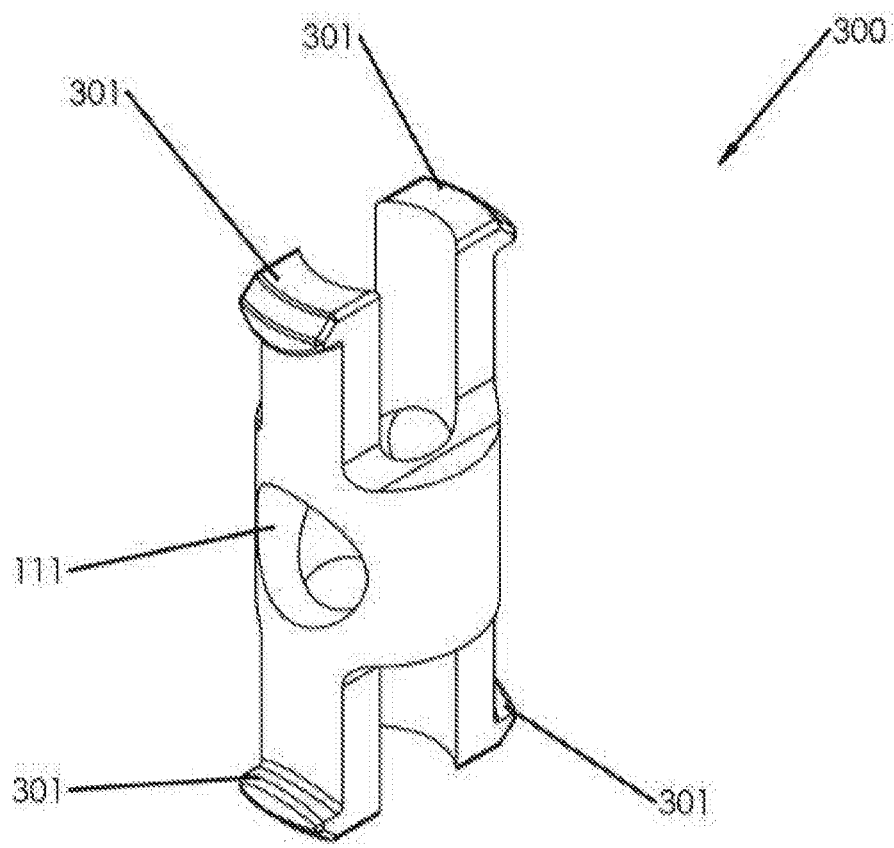
FIG. 12 depicts a perspective view of an embodiment of a spacer 300 of an embodiment of the invention.

Referring now to FIG. 12, a perspective view of an embodiment of a spacer 300 of an embodiment of the invention is depicted. Spacer 300 may have at least one, and preferably a plurality, of retainer clip features 301 configured to snap into snap receiving holes 212 and 213 in main body 102 as depicted in FIG. 3. Spacer 300 may also comprise a hole 211a adapted to line up with hole 211 in main body 102 when at least one spacer snap(s) are snapped into receiving holes 212 and 213 as depicted in FIG. 3, securely attaching spacer 300 to the inside of main body 102. Thus, a user is able to observe though window 211 in main body 102 and hole 211a in spacer 300 that first line end portion 002 has been inserted into collet 105 to the point that it extends all the way through collet 105 such that it may be observed through window 211 in main body 102 and 211a in spacer 300, and likewise window 211 in main body 102 and hole 211a in spacer 300 may provide visibility for a user to observe that second line end portion 003 has been inserted into collet 305 to the point that it extends all the way through collet 305 such that it may be observed through window 211.

Figure 13A:
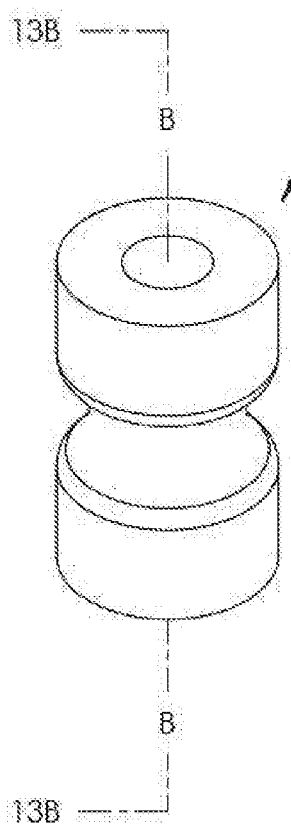
FIG. 13A depicts a perspective view of an embodiment of a collet housing 113 or 313 of an embodiment of the invention.
Figure 13B:
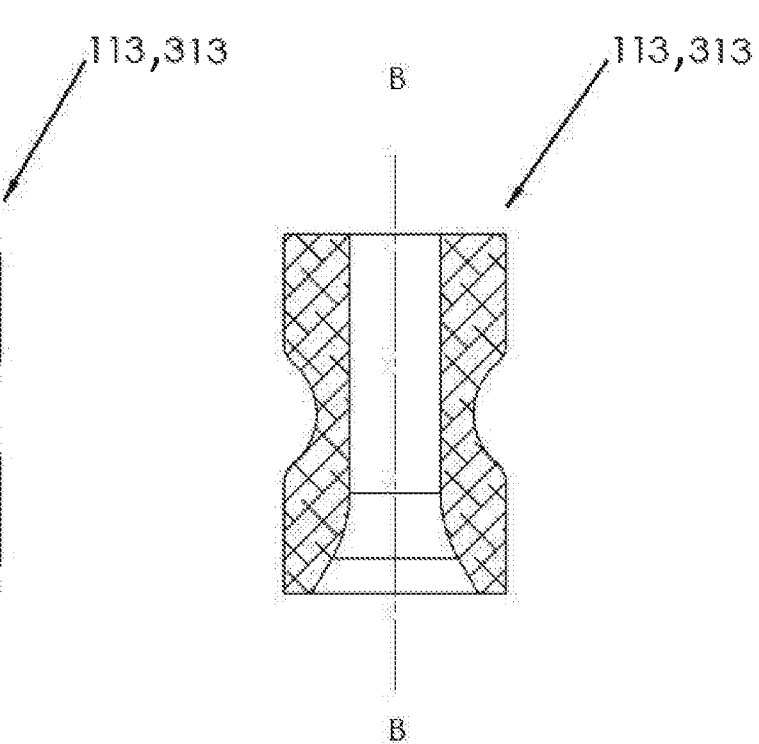
FIG. 13B depicts a cross section view of an embodiment of a collet housing 113 or 313 of an embodiment of the invention.

Referring now to FIGS. 13A and 13B, a perspective view of an embodiment of a collet housing 113 or 313 of an embodiment of the invention, respectively, are depicted. Collets housings 113, 313 may have a lengthwise opening along axis B for allowing collets 105, 305 respectively to pass through collet housing 113, 313, respectively, in a sliding fit. Collet housings 113, 313 may also comprise a conically shaped opening J for receiving the conically shaped exterior portions 401 of collets 105, 305, respectively. In an embodiment, the surface of conically shaped opening J is complementary to the surface of conically shaped exterior portions 401 of collets 105, 305.

Figure 14:
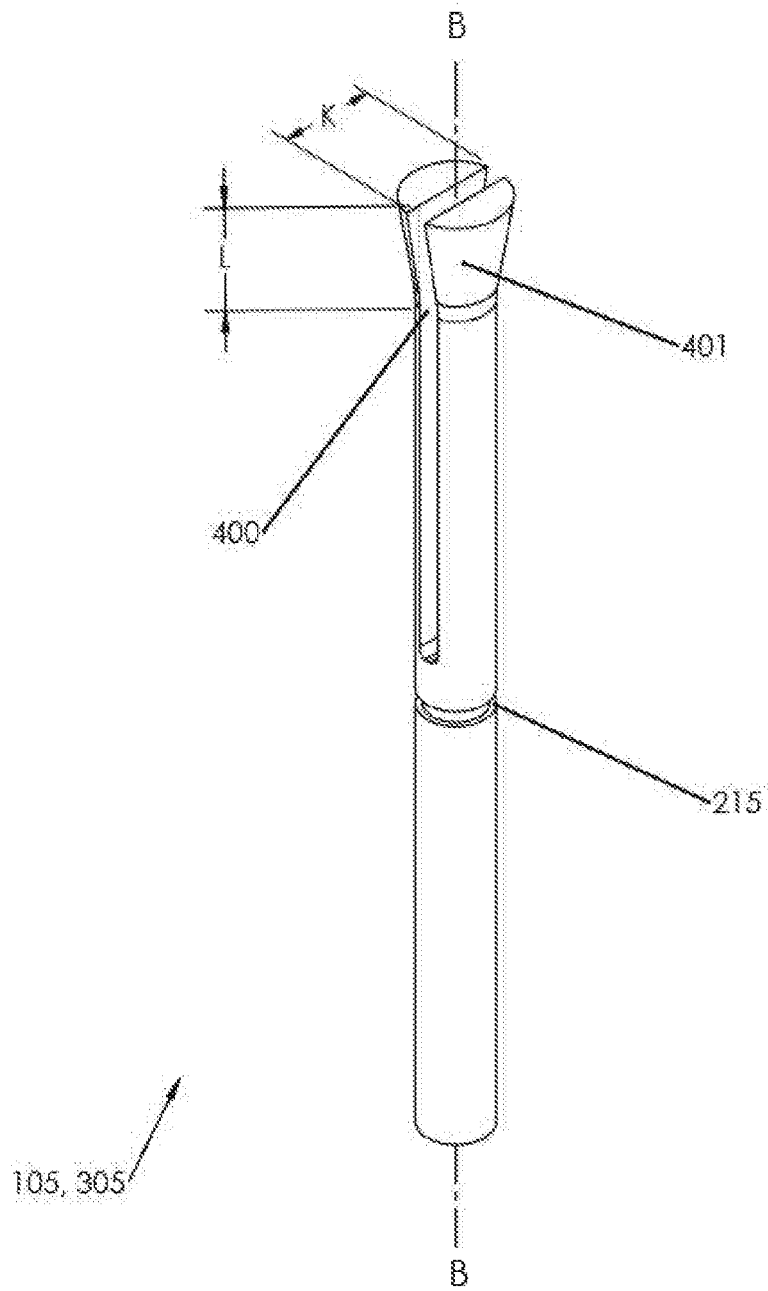
FIG. 14 depicts a perspective view of an embodiment of a collet 105 or 305 of an embodiment of the invention.

Referring now to FIG. 14, a perspective view of an embodiment of collet 105 or 305 of an embodiment of the invention is depicted. Void 400 may take any form of opening that allows section L of collet 105, 305 to deform inwardly such that an inner dimension of void 400 is reduced with section L of collet 105, 305 is subjected to a squeezing force. I.e., void 400 may be a slot (as depicted) or maybe a plurality of slots, or may be formed by one or voids in the walls of section L of collet 105, 305. "Squeezing force" includes within its meaning any array of opposing forces acting on the conical section L of collet 105, 305 that cause void 400 to be reduced in size in a direction transvers to axis B. Thus, a squeezing force is generated when collet 105, 305 is disposed within collet housing opening 220 such that conically shaped exterior portions 401 of collet 105, 305 are in contact with conically shaped opening J in collet housing 113, 313, respectively and collet housing 113, 313 is motivated, or pressed, in the direction of conically shaped exterior portions 401 of collet 105, 305 causing the conically shaped exterior portions 401 of collet 105, 305 to be pressed into conically shaped opening J in collet housing 113, 313, respectively, as is caused by biasing force R when the line attaching apparatus is in a line retention state. When void 400 is reduced to the point that it compresses line end portions 002 or 003 preventing line end portions 002 or 003 from translating in collet opening 216, the line attaching apparatus is in a line retention state.

Figure 15:
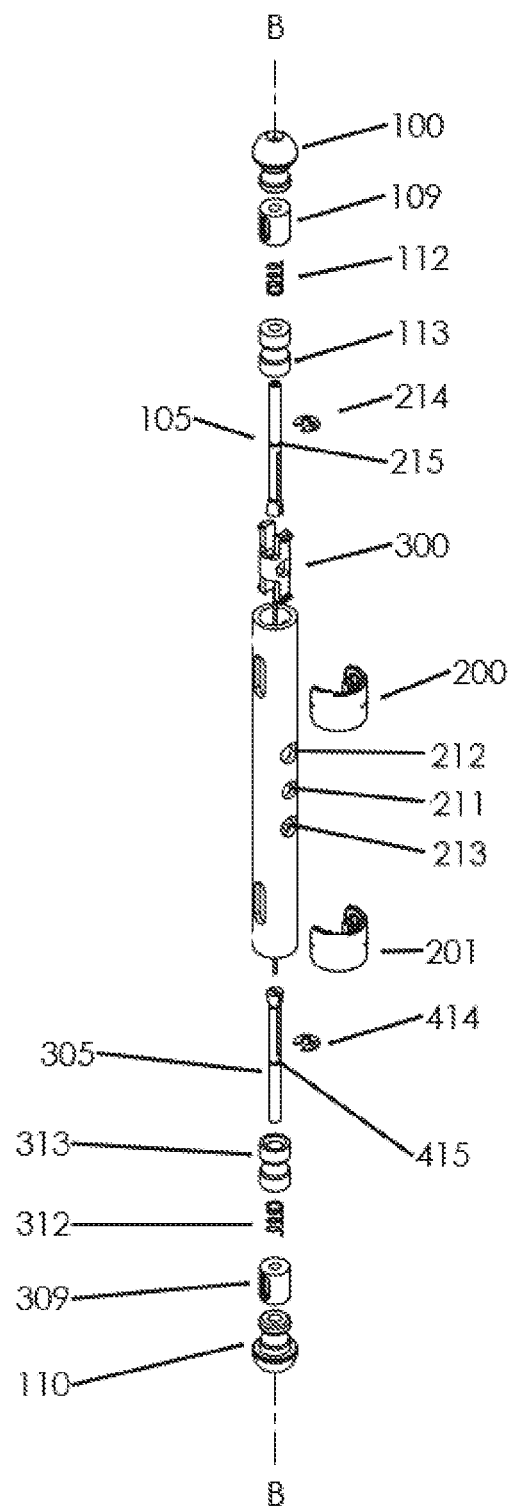
FIG. 15 depicts an exploded view of an embodiment of the invention.

Referring now to FIG. 15, an exploded view of an embodiment of the invention is depicted. In this embodiment of the invention, the hollow main body 102 may be, but is not necessarily, of circular cross section. An exemplary, non-limiting assembly method may include a first step of inserting spacer 300 into hollow main body 102, followed by snapping retainer clips 301 into receiving holes 212 and 213 in main body 102. Next, first collet 105 may be inserted into the opening running lengthwise through first collet housing 113, and first collet 105 may be inserted into first compression spring 112. In a next step, compression spring may be compressed and first E ring 214 may be snapped into its retaining groove 215 in collet 105, capturing first compression spring 112 between a surface of first E ring 214 and a surface of first collet housing 113 such that first compression spring 112 is slightly compressed and causes first collet 105 to be disposed in first collet housing 113 in a line retention state. Next, first collet 105 may be passed through the opening running lengthwise through first plunger 109, and first plunger grip 200 may be assembled onto the line attachment apparatus by manually spreading its opening M to be large enough to pass around the outer surface of main body 102, and then allowing opening M to relax such that at least one first plunger grip 200 second protrusion 115 (depicted in FIG. 8) is allowed to enter into and be received by that at least one first plunger grip receiving opening 111, securing first plunger grip 200 to first plunger 109. In this manner, the portion of the line attaching apparatus identified as line attaching apparatus first portion O in FIG. 2 is assembled. Next, the portion of the line attaching apparatus identified as line attaching apparatus second portion P in FIG. 2 may be assembled by an similar process. Second collet 305 may be inserted into the opening running lengthwise through second collet housing 313, and second collet 305 may be inserted into second compression spring 312. In a next step, second compression spring 312 may be compressed and second E ring 414 may be snapped into its retaining groove 415 in second collet 305, capturing second compression spring 312 between a surface of second E ring 414 and a surface of second collet housing 313 such that second compression spring 312 is slightly compressed and causes second collet 305 to be disposed in second collet housing 313 in a line retention state. Next, second collet 305 may be passed through the opening running lengthwise through second plunger 309, and second plunger grip 201 may be assembled onto the line attachment apparatus by manually spreading its opening M to be large enough to pass around the outer surface of main body 102, and then allowing opening M to relax such that second plunger grip 201 second protrusion 115 (depicted in FIG. 8) is allowed to enter into and be received by second plunger grip receiving opening 111, securing second plunger grip 201 to first plunger 309. While a specific assembly process has been described, any assembly process or order of steps may be used to assemble the line attaching apparatus of the invention, and thus all such alternate ordering of steps is included within the scope of the claimed invention.

Figure 16:
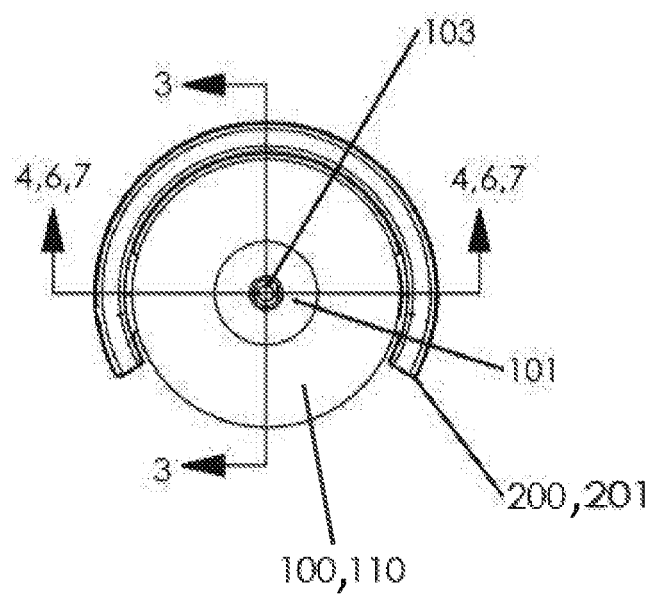
FIG. 16 depicts a top view of an embodiment of the invention, and depicts the direction from which cross sections of the figures are taken.

Referring now to FIG. 16, a top view of an embodiment of the invention, and depicts the direction from which cross sections of the figures are taken is depicted. First end cap 100, first end cap bevel 101, first end cap lengthwise opening 103, and first plunger grip 200 are shown for reference.

In any embodiment, end caps 100, 110; hollow main body 102; collets 105, 305; plungers 109, 309; collet housings 113, 313; plunger grips 200, 201 and spacer 300 may be fabricated from any material suitable for manufacture of mechanical components such as, by way of non-limiting example, plastic, metal, phenolic or any other material. These components may be manufactured by any known means such as extruding, molding, casting, additive manufacturing, machining, or any other known manufacturing process. Although these components are depicted as unitary structures in the figures, each component may be comprised of multiple parts that may be brought together by any known means of attaching components together in including mechanical fasteners, welding, ultrasonic bonding, chemical bonding using adhesives, thermal attachment or any other means of attachment.

In an embodiment of the invention used to achieve an electrical connection between two conductive wires or filaments, the collet, spacer and collet house may be conductive material. In such uses, an insulator such as insulating heat shrinkable tubing, rigid insulating material or other insulating material may cover all or a portion of the exterior surfaces of main body 102.

What is claimed is:

1. A line attaching apparatus, comprising:
an elongate hollow main body having an axis;
a spacer disposed inside said hollow main body and attached to hollow main body;
a collet with an opening there through and having a conically-shaped exterior portion, said conically shaped exterior portion having a void allowing the conically shaped exterior portion to deform when the collet conically shaped section is subjected to a squeezing force such that the collet opening is reduced in cross section;
a collet housing comprising a first end surface and a second end surface, and an opening there through, said collet passing through said collet housing opening such that said collet housing is slidably engaged on said collet, wherein said collet housing opening comprises a conically shaped opening that is complementary to, and receives, said conically shaped exterior portion of said collet;
a plunger, said collet passing through said plunger;
a plunger grip at least partially surrounding an exterior surface of said main body, wherein said plunger grip comprises at least one protrusion passing through at least one opening in said main body, said at least one plunger protrusion attached to said plunger such that said plunger is translated within said hollow main body when said plunger grip is translated in a direction parallel to said axis;
wherein said collet opening is sized to receive a line end portion in a sliding engagement when said line joining apparatus is in a line insertion/removal state; and
wherein said collet and said collet housing are disposed within said main body and said second end surface is in contact with said spacer;
a compression spring providing a biasing force between said collet and said collet housing, and wherein:
in a line retention state, said compression spring is at least partially compressed wherein said biasing force acts to force said collet exterior conically shaped exterior portion into said collet housing conically shaped opening, causing a squeezing force on said collet conically shaped exterior portion, deforming said collet conically shaped exterior portion such that said collet opening is reduced in size and tightens against said line end portion in a friction fit that prevents said line end portion from being translated in said collet opening; and wherein
in a line insertion/removal state, said plunger and said collet are motivated against said biasing force towards said collet housing by a translating force applied to said plunger grip, compressing said compression spring to a greater degree than when said line joining apparatus is in a line retention state, motivating said collet conically shaped exterior portion away from said collet housing conically shaped exterior portion, reducing the squeezing force on said collet housing conically shaped portion and allowing the collet opening to expand and allowing said line end portion to translate within said collet opening.

2. The line retention apparatus of claim 1, further comprising an end cap disposed in a first end of said main body, said line passing through an opening in said end cap.

3. The line retention apparatus of claim 1, wherein said main body is defined as a hollow tube of circular cross section.

4. The line retention apparatus of claim 1, wherein said spacer is further defined as comprising clips, and wherein said clips are snapped into snap receiving holes disposed in said main body, holding said spacer in place inside said main body and preventing said spacer from translating within said main body.

5. The line attaching apparatus of claim 1, wherein said main body further comprises a window allowing a user to observe that said first line end portion has been inserted into said first collet such that it extends completely through said first collet, and to observe that said second line end portion has been inserted into said second collet such that it extends completely through said second collet.

* * * * *